United States Patent [19]

Mason

[11] Patent Number: 5,214,755
[45] Date of Patent: May 25, 1993

[54] DOCUMENT PROCESSING METHOD AND SYSTEM

[75] Inventor: Christopher A. Mason, Bothell, Wash.

[73] Assignee: Microsoft Corporation, Redmond, Wash.

[21] Appl. No.: 764,105

[22] Filed: Oct. 18, 1991

Related U.S. Application Data

[63] Continuation of Ser. No. 700,086, May 6, 1991, abandoned, which is a continuation of Ser. No. 343,082, Apr. 25, 1989, abandoned.

[51] Int. Cl.$^5$ .............................................. G06F 15/20
[52] U.S. Cl. ..................................... 395/147; 395/148
[58] Field of Search ................................ 395/144-149

[56] References Cited

U.S. PATENT DOCUMENTS

| | | | |
|---|---|---|---|
| 4,723,209 | 2/1988 | Hernandez et al. | 395/147 |
| 4,723,210 | 2/1988 | Barker et al. | 364/300 |
| 4,723,211 | 2/1988 | Barker et al. | 395/147 |
| 4,829,470 | 5/1989 | Wang | 395/147 |
| 4,891,770 | 1/1990 | Hollett | 364/521 |
| 4,891,771 | 1/1990 | Edel et al. | 364/523 |

*Primary Examiner*—Heather R. Herndon
*Attorney, Agent, or Firm*—Seed and Berry

[57] ABSTRACT

An improved document processing system is disclosed wherein objects such as text areas, numerical tables or graphic data may be assigned a fixed location within a document. The system automatically allocates layout areas that surround the fixed areas without overlapping. Means are provided for linking text from one side of a fixed object to the other side while automatically maximizing the area available for free text or other objects. The invention allows an infinite number of fixed objects, and automatically generates page layout. In addition, the invention allows the user to set page size, page margins, and the size of fixed-position objects relative to page size. The system allows the use of numerous page formats, including multiple columns, and then automatically generates page layouts where the text area is maximized. These steps require a minimum of interaction with the user.

13 Claims, 9 Drawing Sheets

The largest single propulsion was the The first supersonic being designed by the major changes in aircraft-broader wings and thick length, rearranged pack-seats, larger fuel capacity more powerful engines advance in aircraft invention of the jet engine. Military aircraft were early 1950's. There were craft design including skins, greater body ing of equipment, ejector weight and considerably for supersonic flight.

Until the mid-1950's it had seemed sensible to strive for greater speed and altitude. But is was finally realized that improvements in surface-to-air missiles would make high-altitude flights risky and attack aircraft had to be designed or modified to fly as low as possible to try to escape radar detection and give defenders less warning. A new generation of bombers was planned, some of them notable for variable-sweep wings that could be spread out for takeoff, cruising flight, and landing. These wings could also be folded sharply backward for a low-level dash at high speed. The first such "swing-wing aircraft was the US F-111 Bomber.

In contrast, some pure interceptors of the 1970's have fixed-wings. Here the primary needs are engine power and a large wing area, for outstanding maneuverability. In 1955 fixed guns were considered obsolete and fighters became equipped with air-to-air guided missiles. But all new fights now have guns for close-range dog-fighting as well as special close-range missiles.

Dramatic advances have been made in radar systems for gaining a detailed picture of the whole battle scene. But some recent tactical aircraft have no target-seeking radar and also rely mainly on the pilot's eyesight to attack targets. In antisubmarine warfare the task is to pack inside one aircraft a versatile array of sensing systems for detecting a submerged submarine and weapons for destroying it. The aircraft may be a land-based jet, a carrier-based airplane with folding wings, or a large helicopter. Modern military transports are being designed for the ability to use short unpaved airstrips.

A major factor in modern military aircraft is their astronomic cost. For this reason many nations have chosen to collaborate on joint projects.

DOCUMENT PROCESSING METHOD AND SYSTEM

Cross-Reference to Related Application

This application is a continuation of U. S. application Ser. No. 07/700,086, filed May 6, 1991, now abandoned, which was a continuation of Ser. No. 07/343,082, filed Apr. 25, 1989, now abandoned.

FIELD OF THE INVENTION

This invention relates to the field of document processors and more specifically to a method and means for controlling the relative placement of text and graphic objects on a printed page.

BACKGROUND OF THE INVENTION

Document processors have evolved from a class of computer applications known as word processors and have the unique ability to control the relative position of text and graphic objects on printed pages. Document processors, also referred to as page layout processors, allow free placement of text and graphic objects to produce documents having text and graphics arranged in a variety of column and row formats.

In current document and page layout processors, text and graphic areas may be thought of as areas bounded by "layout rectangles" wherein text and graphic objects within the layout rectangles share common attributes and are treated as one object. Current document or page layout processors require the user to manually define layout rectangles and manually position them within a document. Therefore, while current document processors provide a degree of flexibility unknown in prior systems, they require a significant amount of user interaction to achieve a desired result.

Still another disadvantage of current document processors are the restrictions they place on the placement of text and graphics within the same document. For example, many document processors only permit text be placed on one side of a graphic image. Still other document processors do not permit text to flow from one side of a graphic image to another.

Since the various text and graphic areas are manually placed in a document with the above-mentioned and other restrictions in current document processors, the page layout process can be time consuming and may result with many unused portions of a page.

From the foregoing, no document processing system is known which allows for free placement of fixed text and graphic objects in a document while also providing for the automatic placement of free text and graphic objects in areas surrounding the fixed text and graphic objects while maximizing the amount of page area available to a user.

SUMMARY AND OBJECTS OF THE INVENTION

In summary, the present invention contemplates a document processor wherein objects such as text areas or graphic images may be assigned fixed, predetermined locations within a document. The present document processing system then automatically allocates layout areas which may be filled with free text or other objects wherein the automatically generated layout areas surround the fixed areas without overlapping. Means are also provided for chaining text from one side of a fixed object to the other. The present document processor allows for the placement of an infinite number of fixed objects and automatically maximizes the layout areas available for free text or other objects.

Accordingly, it is an object of the present invention to provide a method and means for automatically generating a page layout.

It is another object of the present invention to provide a method and means for generating a page layout wherein chained text may be placed on either side of a absolutely positioned text or graphics object.

It is still another object of the present invention to provide a document processing system which automatically optimizes the page area available to a user for a given page layout.

These and other objects may be fully understood through the description and accompanying drawings which follow:

BRIEF DESCRIPTION OF THE DRAWING

FIGS. 5A-5J are a series of diagrams showing the series of steps used to generate the page layout of FIG. 2.

FIGS. 6A-6K are a series of diagrams showing the series of steps used to generate the page layout of FIG. 3.

DETAILED DESCRIPTION OF THE INVENTION

While the document processing system of the present invention may be adapted for use with any number of well known text and graphic systems such as Aldus Pagemaker and Framemaker, it is particularly adapted for use with a well known document processor such as Microsoft Word. Microsoft Word is widely available for use with a variety of computer systems based on either the MS-DOS or Mac-OS operating systems, both of which are compatible with a variety of microprocessors such as the 80286 microprocessor available from Intel and the 68020 microprocessor available from Motorola, respectively. Those skilled in the art will appreciate that the 80286 microprocessor and the 68020 microprocessor are members of families of upwardly compatible microprocessor systems. Both the MS-DOS and Mac-OS versions of Microsoft Word as well as the document processing system of the present invention may be implemented with the well known "C" programming language, and compiled to generate the assembly language program required by the desired microprocessor system.

The Microsoft Word document processor is based on the concept of properties. Specifically, document properties, section properties, paragraph properties and character properties are specified. The present invention is primarily used to manipulate document properties, section properties, and paragraph properties. The present invention introduces a new property known as positioning. For example, variables such as margins are specified as document properties. Variables such as the number of columns are specified as section properties. Variables such as indents and tab locations are specified as paragraph properties. The positioning property of the present invention allows a user to specify a group of paragraphs which may be treated as one object, to specify the width of the object, the vertical (X) and horizontal (Y) position of the object within a document and the amount of "dead space" surrounding the object where no text is allowed. In addition to text objects, the positioning property of the present invention may also be used with graphic objects and table objects. Table objects may suitably comprise complete spreadsheets or portions of spreadsheets. This positioning property also allows a user to "chain" objects so that text objects located on either side of a graphic object may be linked and automatically filled with related text from one or more paragraphs.

In a hierarchical sense, paragraphs are formed with groups of characters, sections are formed with groups of paragraphs, and documents are formed with groups of sections. The positioning property is used to specify the position of paragraphs wherein contiguous paragraphs with the same positioning are considered one object.

The present invention is based on the concept of layout rectangles (LR) wherein a page in a document may be thought of as being defined by one or more layout rectangles. The layout rectangles specify the position, width and height of page area available to a user. The present invention is also based on the concept of Absolutely Positioned Objects (APO) wherein a paragraph or group of paragraphs may be placed at a specific location on a page by a user. An APO may also comprise a graphic object or a table object.

Figure 1:
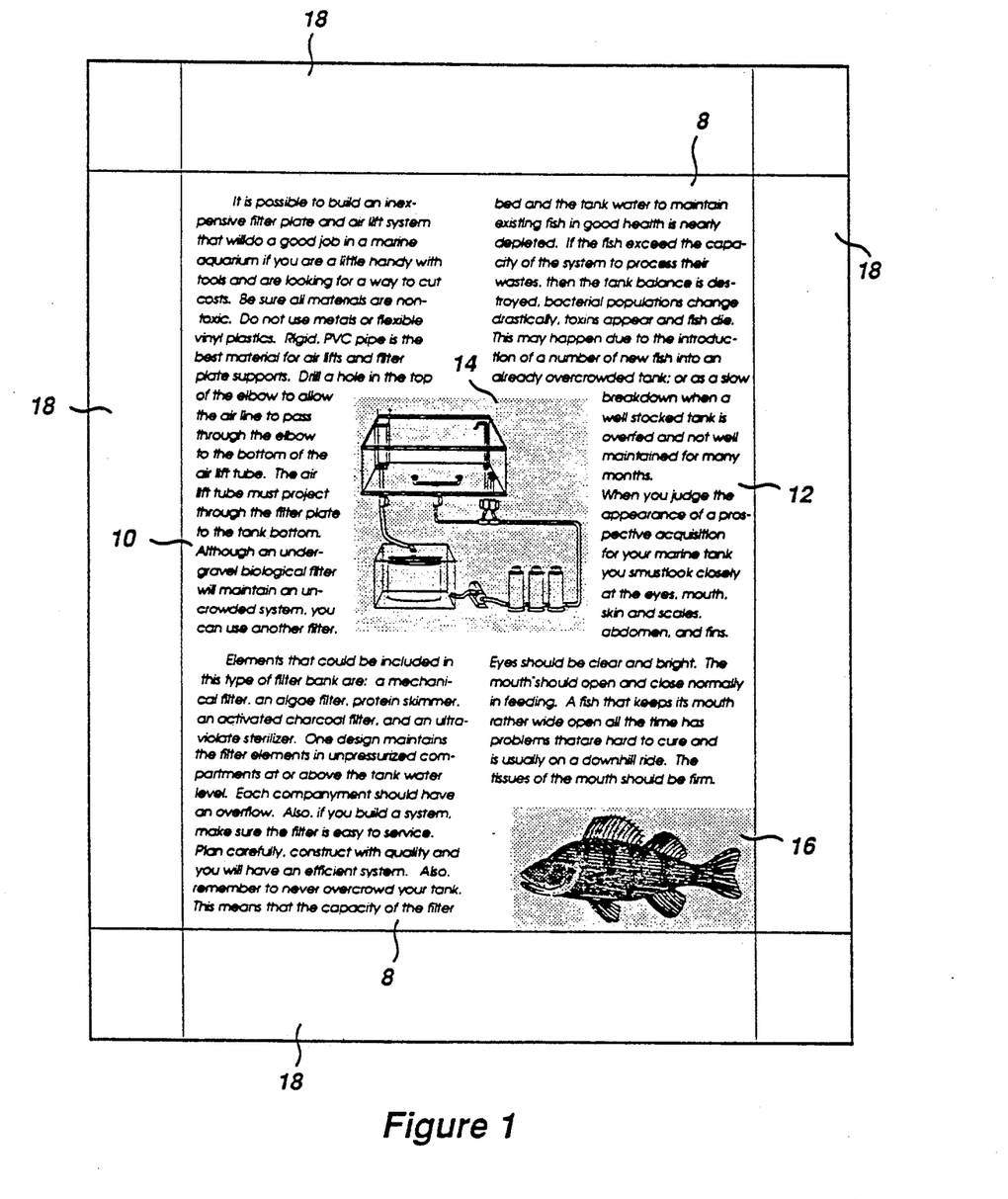
FIG. 1 is a diagram of a typical page layout having graphic objects and text arranged in a multi-column format.
Figure 2:
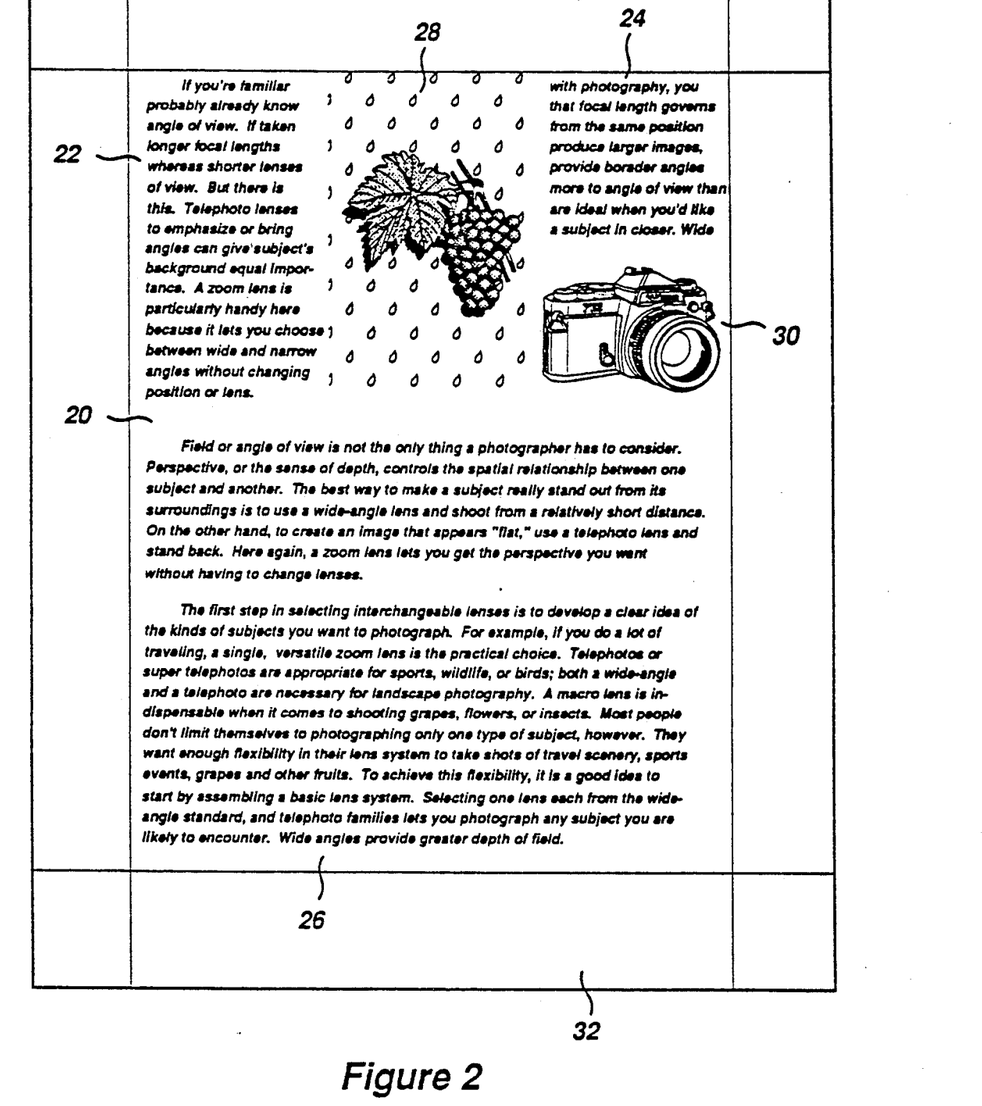
FIG. 2 is another diagram of a page layout having graphic objects and text.
Figure 3:
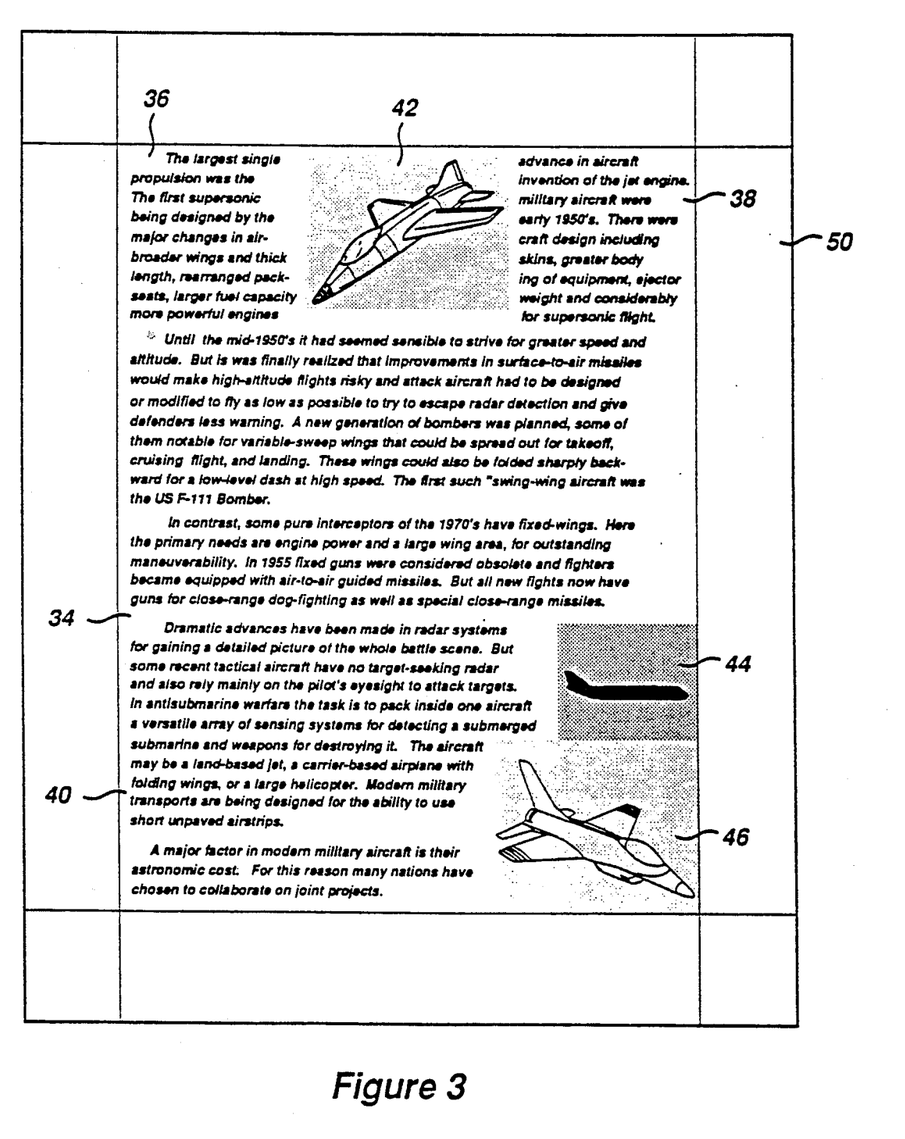
FIG. 3 is yet another diagram of another page layout having graphic objects and text arranged in a full page layout.

FIGS. 1-3 show three typical page layouts which may be generated with the document processor of the present invention. Referring now to FIG. 1, a typical page layout may include a text area 8 which includes a number of columns of text 10, 12 and a number of graphic objects 14, 16 bounded by margins 18. The graphic objects 14, 16 may be specified as APOs wherein the document processing system of the present invention automatically determines the remaining area available for text by generating a plurality of layout rectangles which may be filled with text or graphic objects. Note that the APO 14 is positioned in an area which intersects columns 10, 12. The process of generating the layout rectangles for the page layout of FIG. 1 is discussed in more detail in conjunction with FIG. 4A-4Q.

Referring now to FIG. 2, another page layout may include a text area 20 including columns 22, 24, 26, and absolutely positioned objects 28, 30 bounded by margins 32. The text on either side of APO 28 may be chained such that the last text item on the left side of APO 28 is followed by the next item in a text stream which may automatically be positioned in the first space on the same line beginning on the right side of APO 28. The process of generating the layout rectangles for the page layout of FIG. 2 and the concept of chaining is discussed in more detail in conjunction with FIGS. 5A-5J.

Referring now to FIG. 3, still another page layout may include a text area 34 including areas 36, 38, 40, and APOs 42, 44, 46 which may be bounded by margins 50. As will be discussed in more detail below, the present invention includes means for automatically generating layout rectangles in conjunction with APOs which may not directly align with a line of text. For example, the bottom "y" coordinate of APO 42 may be located halfway through a line of text in area 36. When creating layout rectangles in this situation, layout rectangles are created with "soft bottoms" so that text flowing around objects such as APO 42 will be contiguous without generating gaps between the lines of text. The process of generating the layout rectangles for the page layout of FIG. 3 and the concept of soft bottoms is discussed in more detail in conjunction with FIGS. 6A-6K.

The document processor of the present invention consists of three main components: FAssignLr which creates a layout rectangle from a text rectangle; ConstrainToAbs which modifies the size of a layout rectangle to eliminate intersections with APOs; and a text filling routine which fills the generated layout rectangle with text from a text stream created by a user in a word processing or text editing type environment. Text filling routines are well known, widely used and are incorporated in virtually every conventional word processor. Virtually any well known text filling routine is compatible with the document processor of the present invention and accordingly, the text filling routine is not further described herein.

The FAssignLr and ConstrainToAbs components are described in detail in conjunction with the pseudo-code listings shown in Tables 1 and 2 below. A general overview of the operation of these components is described in conjunction with FIGS. 4A-4Q, 5A-5J, and 6A-6K. Briefly, FAssignLr receives as input, the current character position in a document, the current vertical (Y) position on the page, the dimensions of the current text rectangle; an array of layout rectangles including the current layout rectangle; and the position of the bottom of the page. A layout rectangle is a proposed rectangle for the next portion of the document to be formatted into. The present invention accepts text rectangles and modifies them to avoid intersections with other rectangles. The output of FAssignLr is a text area into which the next text in a text stream may flow.

ConstrainToAbs is invoked by FAssignLr whenever APOs are present and it receives as input the current vertical (Y) position of the page, the current layout rectangle, an array of layout rectangles including the current layout rectangle, and the position of the bottom of the page. The output of ConstrainToAbs is a modified layout rectangle and possibly a reserve layout rectangle. A reserve layout rectangle is a rectangle which describes the right half of a layout rectangle when it is split by an APO. The reserve rectangle forms the basis of chaining. The reserve layout rectangle and its corresponding left layout rectangle are typically processed on separate invocations of ConstrainToAbs.

The present invention provides a method and means of positioning text and APOs on a page. For the purposes of this invention, APOs may comprise text, graphic objects, tables, etc. Text may also comprise alphanumeric symbols, graphic objects, tables, etc. However, when defined as text, graphic objects are treated in the same manner as an alphanumeric symbol. For example, a graphic object may be treated as an alphanumeric symbol in a very large font size which is placed in a document with the text filling routine.

Generally, when generating a page layout, the word processing portion of the document processor invokes the page layout components and instructs the page layout components as to the starting point in document text. This may occur when generating a page layout on a display or when printing a page. A starting point on the subject page is then assigned. FAssignLr is then invoked to allocate a layout rectangle for text to fit in. A text filling routine is then invoked to determine how much space the current paragraph requires. The text filling routine receives as input the current page position, the layout rectangle and the current text and returns a new page position further down the page and a new position in text. The text filling routine also returns whether there is additional room on a page. FAssignLr is then repeatedly invoked for each paragraph until the end of the document is reached or until no other room is available on a page.

Figure 4A:
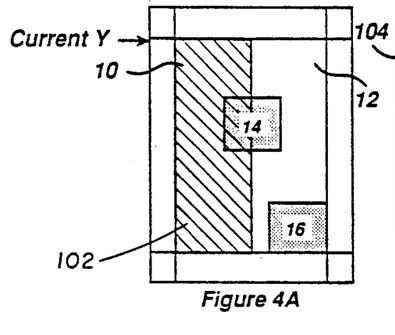
FIGS. 4A-4Q are a series of diagrams showing the series of steps used to generate the page layout of FIG. 1.
Figure 4B:
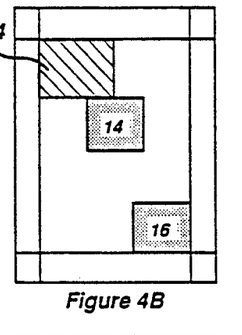
Figure 4C:
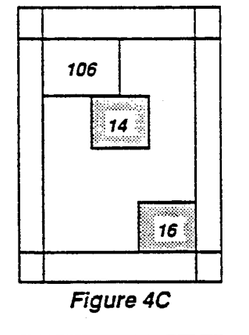
Figures 4D, 4E, 4F:
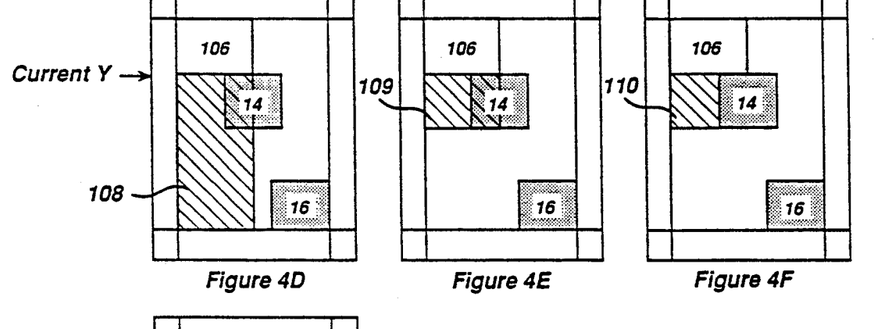
Figure 4G:
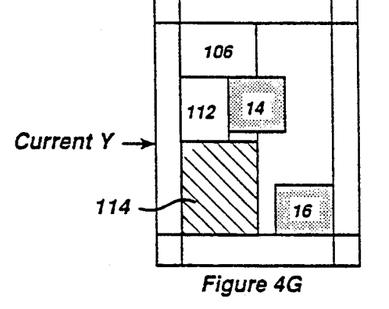
Figure 4H:
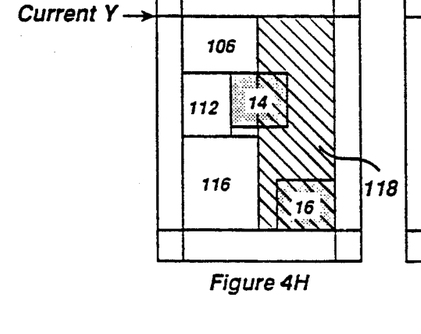
Figure 4I:
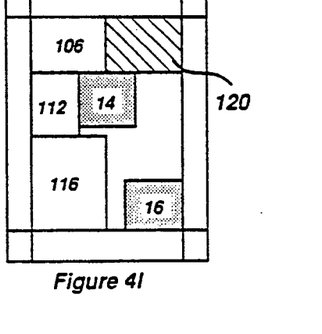
Figure 4J:
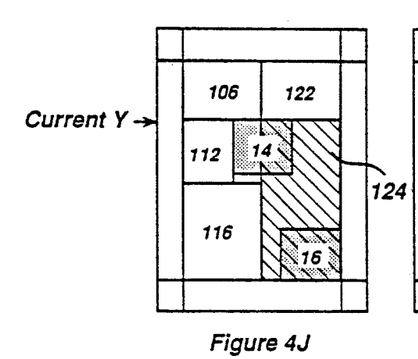
Figure 4K:
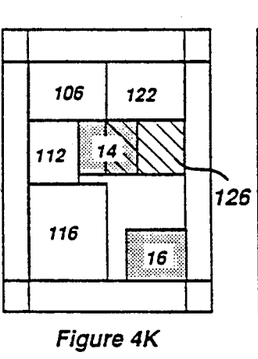
Figure 4L:
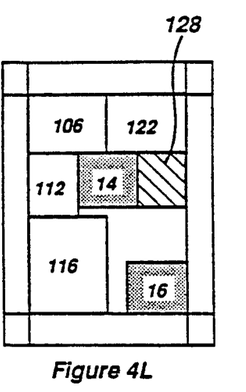
Figure 4M:
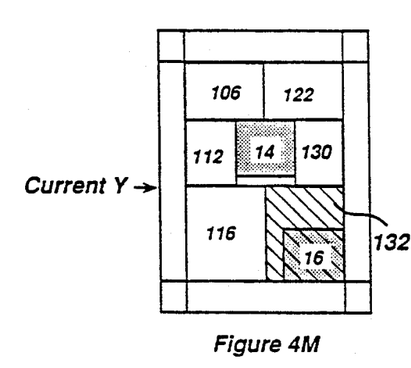
Figure 4N:
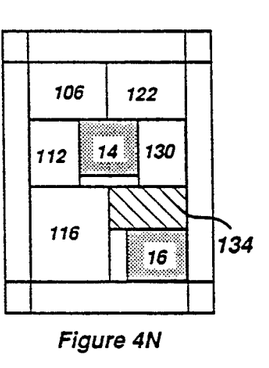
Figure 4O:
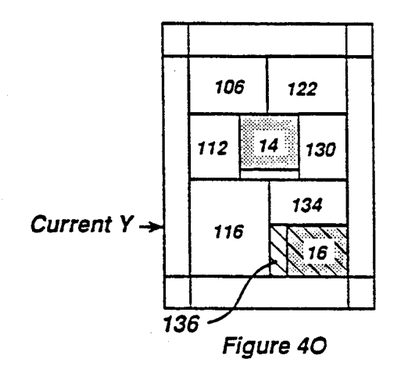
Figure 4P:
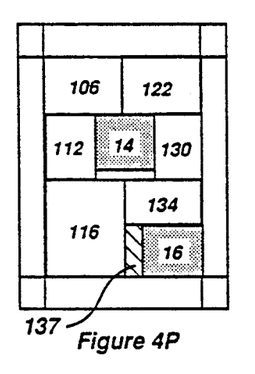
Figure 4Q:
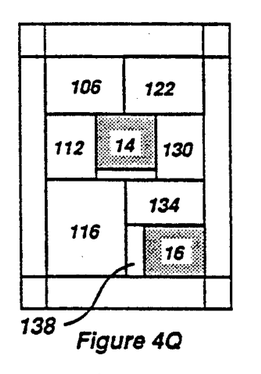

FIGS. 4A–4Q are diagrams which demonstrate the sequence of steps used to create the page layout of FIG. 1. Typically, the position and size of one or more APOs will be defined prior to invoking FAssignLr. As shown in FIG. 1 and FIG. 4A, the page layout discussed in this section includes a multi-column format for text having columns 10, 12 and two APOs 14, 16. When creating a layout for column layouts, each column is processed independently. When invoked, FAssignLr creates a default layout rectangle 102 which is the size of the entire first column 10. Since the default layout rectangle 102 intersects APO 14, ConstrainToAbs is invoked to eliminate the intersection. ConstrainToAbs eliminates the intersection and returns the default layout rectangle 104. The result of this iteration of ConstrainToAbs is the creation of the text area 106. The text filling routine then updates the vertical position pointer "Y" by filling the created rectangle with text and returning the position of the last space filled with text. The vertical position pointer "Y" points to the starting point for the next iteration of FAssignLr or the vertical starting point for next default layout rectangle.

The next invocation of FAssignLr creates the default layout rectangle 108. ConstrainToAbs is then invoked to eliminate the intersection with APO 14. The bottom of default layout rectangle 108 is set equal to the bottom of APO 14 resulting default layout rectangle 109. ConstrainToAbs eliminates the intersection of APO 14 and default layout rectangle 109 and returns the default layout rectangle 110. The result of this iteration of ConstrainToAbs is the creation of text area 112. The text filling routine then updates the vertical position pointer "Y" by filling the created rectangle with text and returning the position of the last space filled with text.

The present invention provides a method and means of creating text areas which, minimize the amount of unusable page area surrounding an APO. For example, in certain circumstances, default layout rectangles are provided with "soft bottoms" wherein text may exceed the space allocated by the default layout rectangle by a predetermined number of lines. In the preferred embodiment of the present invention, text in a layout rectangle with a soft bottom may exceed the allocated area by one line. Soft bottoms are particularly useful in situations where an APO does not align perfectly with a line of text, but rather aligns midway through the text line. If a text area without a soft bottom was not created in this situation, the resulting page layout would have a gap between the lines of text in this area. In still other situations, soft bottoms are not permissible. For example, if a text area ends on the top of an APO, any overflowing text would intersect the APO. Therefore, the present invention recognizes the type of intersection under test and creates the appropriate type of text area.

An example of text areas with and without soft bottoms are shown in FIGS. 4G and 4D, respectively. Since text area 106 ends on the top of APO 14, this text area is created without a soft bottom. In contrast, bottom of text area 112 does not come in contact with an APO and is therefore created with a overflow area with respect to the bottom edge of or "y" of APO 14. Soft bottoms are controlled with a three state flag which is set upon creation of a default layout rectangle. The possible states of this flag are YES, NO and MAYBE. MAYBE means the flag has not yet been set; YES means that the last line of text in the LR may exceed the bottom of the rectangle; NO means the LR's bottom may not be exceeded. The YES setting causes text that is flowing around an APO to be contiguous and to not have gaps between lines. Upon detection of an APO under a text area, the flag is set to NO. Whether the overflow area allocated by a soft bottom is actually filled with text depends on the paragraph(s) placed in the text area by the text filling routine. The operation of this aspect of the present invention is discussed in further detail below. For the purposes of explanation, the text area 112 is created with a soft bottom.

The next iteration of FAssignLr creates the default layout rectangle 114. Since an intersection with an APO was not detected, the text area 116 is created. Further, since all available area to the bottom of the page has now been processed, the "Y" position pointer is reset to the top of the page to process column 12.

The next iteration of FAssignLr creates the default layout rectangle 118. Since the default layout rectangle 118 intersects APOs 14, 16, ConstrainToAbs is invoked to eliminate the intersections. On this iteration of ConstrainToAbs, the bottom edge of default layout rectangle 118 is raised to the top edge of APO 14 resulting in default layout rectangle 120. Since default layout rectangle 120 does not intersect an APO, ConstrainToAbs returns text area 122. The text filling routine then updates the vertical position pointer "Y" to point to the bottom of text area 122. Note, text area 122 is created without a soft bottom.

The next iteration of FAssignLr creates default layout rectangle 124 which extends from the position pointed to by the "Y" pointer (the bottom of text area 122) to the bottom of the page. Since default layout rectangle 124 intersects two APOs, ConstrainToAbs is invoked to eliminate the intersection. Initially, ConstrainToAbs brings the bottom edge of the default layout rectangle 124 equal to the bottom edge of APO 14 resulting in default layout rectangle 126. Next, the left side of default layout rectangle 126 is brought equal with the right side of APO 14 resulting in default layout rectangle 128. Since default layout rectangle 128 does not intersect an APO, ConstrainToAbs returns text area 130 and the text filling routine updates the "Y" position pointer. The text area 130 is shown as requiring the overflow area of the soft bottom.

The next iteration of FAssignLr creates default layout rectangle 132 which extends from the bottom of text area 130 to the bottom of the page. Since default layout rectangle 132 intersects a APO, ConstrainToAbs is invoked to eliminate the intersection. ConstrainToAbs brings the bottom of default layout rectangle 132 equal to the top of APO 16 thus eliminating the intersection. Text area 134 is then returned and the "Y" position pointer is updated by the text filling routine.

The next iteration of FAssignLr creates default layout rectangle 136 which extends from the bottom of text area 134 to the bottom of the page and which intersects APO 16. ConstrainToAbs is then invoked to eliminate the intersection. One feature of the present invention is that it will not create a text area narrower than a predetermined width. In the preferred practice of the present invention, this minimum width is one inch although any minimum width could be chosen. When ConstrainToAbs eliminates the intersection of default layout rectangle 136 and APO 16, the resulting area is narrower than a desired minimum width as shown by area 137. Thus, no text area is returned and the area 138 is not used as shown in FIG. 4Q. When the entire page has been processed, FAssignLr's caller returns a series of text areas which have been created one by one by FAssignLr which may be filled with text. The resulting page layout may then be displayed to a user or printed.

Referring now to FIGS. 5A-5J, the generation of the page layout of FIG. 2 is described. The page layout of FIG. 2 has a single text column 20 and APOs 28, 30. The APOs 28, 30 are positioned on the page prior to the generation of layout rectangles. When initially invoked, FAssignLr creates default layout rectangle 140 which extends from the position pointed to by the "Y" position pointer (in this case the top of the page) to the bottom of the page. Since an intersection with an APO is detected, ConstrainToAbs is invoked to eliminate the intersection(s). ConstrainToAbs brings the bottom of default layout rectangle 140 equal to the bottom of APOs 28, 30 to create default layout rectangle 142. In this case, default layout rectangle 142 intersects APOs 28, 30. ConstrainToAbs then creates default layout rectangle 144 and reserve layout rectangle 146 and returns to FAssignLr. FAssignLr recognizes that a reserve rectangle has been created and ConstrainToAbs is invoked again to eliminate the intersection of reserve layout rectangle 146 and APO 30 resulting in layout rectangles 144, 148 which are then chained by FAssignLr. FAssignLr then sets the height of layout rectangle 144 equal to the height of layout rectangle 148 and FAssignLr returns text areas 152, 154. Upon returning, the text filling routine is invoked to update the "Y" position pointer to point to the bottom of text areas 154, 152.

Figure 5A:
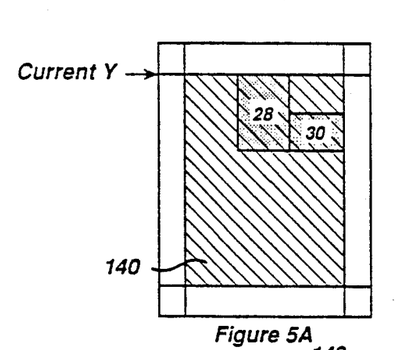
Figure 5B:
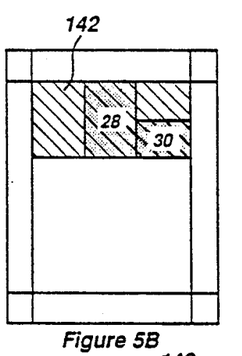
Figure 5C:
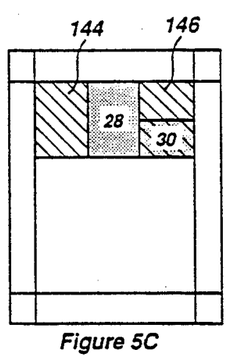
Figure 5D:
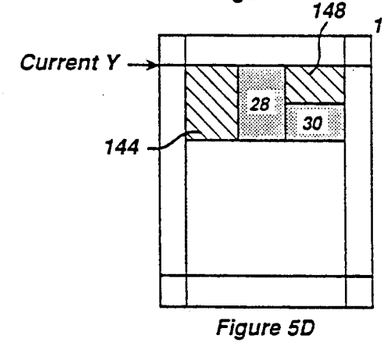
Figure 5E:
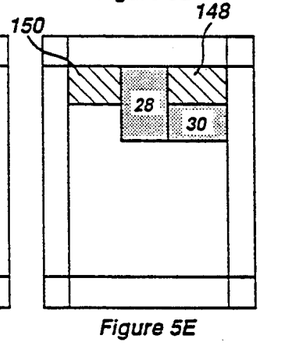
Figure 5F:
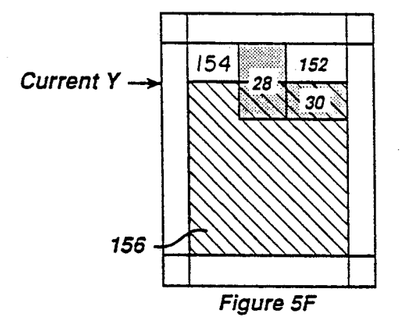
Figure 5G:
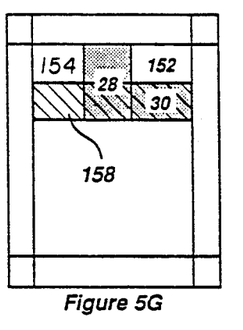
Figure 5H:
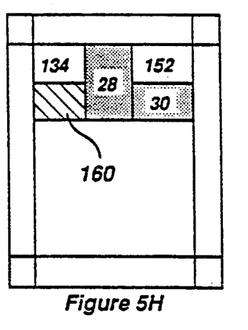
Figure 5I:
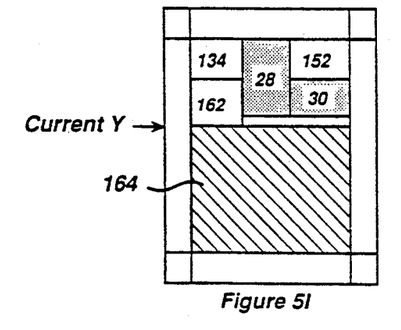
Figure 5J:
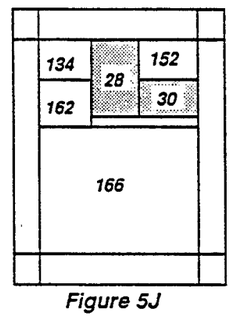

During the next invocation of FAssignLr, default layout rectangle 156 is defined from the position pointed to by the "Y" pointer to the bottom of the page. Since default layout rectangle 156 intersects APOs, ConstrainToAbs is called to eliminate the intersection. ConstrainToAbs first sets the default layout rectangle bottom position equal to the bottom of APOs 28, 30, thus creating default layout rectangle 158. In determining whether to create a layout rectangle with a soft bottom, ConstrainToAbs determines whether the bottom of the current layout rectangle is less than the bottom of the page (or the top of the highest APO on the page which intersects the text rectangle, whichever is smaller), in which case, the soft bottom flag is set to YES. Otherwise, it is set to NO. In FIG. 5H, the layout rectangle 160 is created with a soft bottom, resulting in text area 162. Upon return of ConstrainToAbs, FAssignLr creates default layout rectangle 164. Since default layout rectangle 164 does not intersect an APO, FAssignLr returns text area 166 and the page layout process is terminated.

Referring now to FIGS. 6A-6K, the sequence of steps for generating the page layout of FIG. 3 is shown. The page layout of FIG. 3 comprises a single column of text 34 and APOs 42, 44 and 46. When invoked, FAssignLr creates a default layout rectangle 168 equal to the size of the full page. Since an intersection with APOs is detected, ConstrainToAbs sets the bottom of default layout rectangle 168 equal to the bottom of APO 42 to create default layout rectangle 170. ConstrainToAbs then creates default layout rectangle 172 and reserve layout rectangle 174. On subsequent iterations of ConstrainToAbs, text area 176 is returned with a soft bottom and text area 178 is returned with a soft bottom while being chained to text area 176 and the "Y" position pointer is updated to point to the beginning of the next default layout rectangle.

Figure 6A:
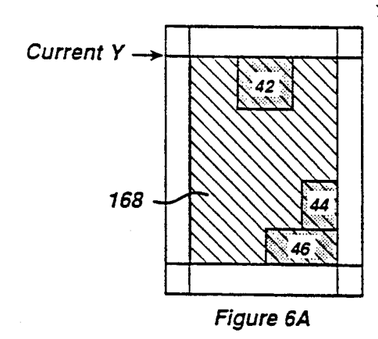
Figure 6B:
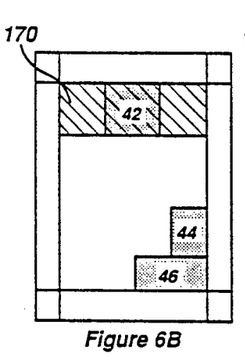
Figure 6C:
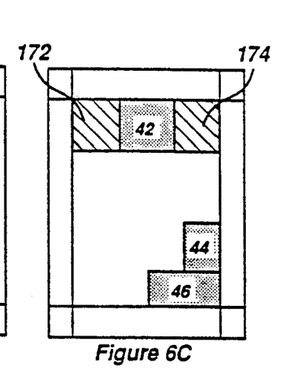
Figure 6D:
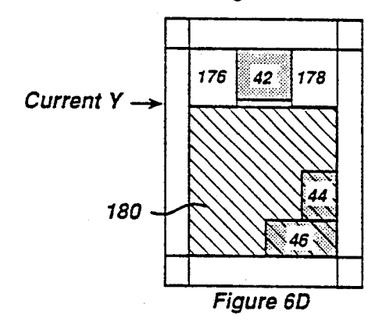
Figure 6E:
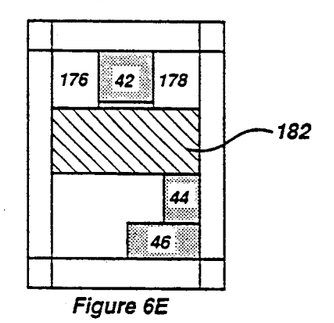
Figure 6F:
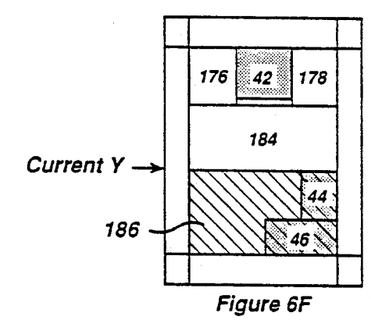
Figure 6G:
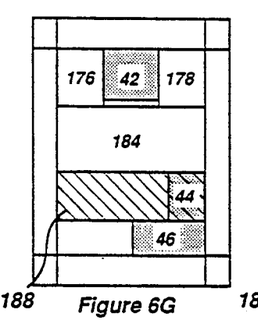
Figure 6H:
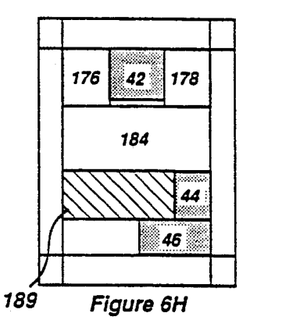
Figure 6I:
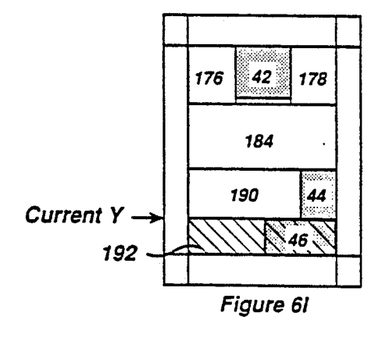
Figure 6J:
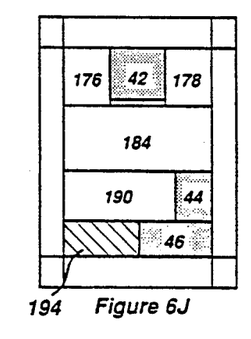
Figure 6K:
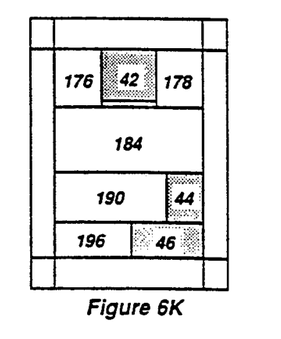

On the next iteration of FAssignLr, default layout rectangle 180 is created and ConstrainToAbs is called to eliminate the intersections with APOs 44 and 46, resulting in the creation of default layout rectangle 182. Since default layout rectangle 182 does not intersect an APO, text area 184 is returned. Once text area 184 is returned, default layout rectangle 186 is created and modified to create default layout rectangle 188. ConstrainToAbs is invoked to eliminate the intersection between default layout rectangle 188 and APO 44 resulting in default layout rectangle 189. Since default layout rectangle 189 does not intersect an APO, text area 190 is returned. Once text area 190 is returned, default layout rectangle 192 is created and modified to create default layout rectangle 194. Since default layout rectangle 188 does not intersect an APO, text area 796 is returned.

The above examples are relatively simple instances of page layouts and are merely exemplary of the operation of the present invention. More complicated instances include cases wherein APOs do not have aligning top and bottom edges and when APOs are located with less than a predetermined minimum distance between them. Examples of these cases are shown in FIGS. 7 and 8.

Figure 7:
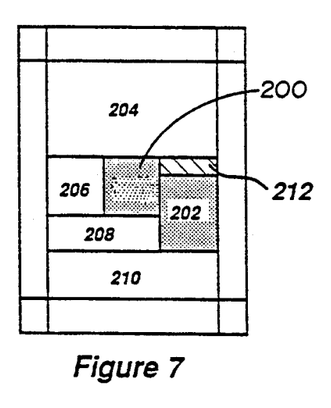
FIG. 7 is a diagram of a page layout having text on non-aligning absolutely positioned objects.

FIG. 7 shows a resultant page layout having non-aligning APOs. The page layout of FIG. 7 comprises APOs 200, 202, and text areas 204, 206, 208 and 210. In this page layout, area 212 has a height less than a predetermined minimum height. In this instance, the present invention allocates an area of "dead space" 212 which cannot be filled with text.

Figure 8:
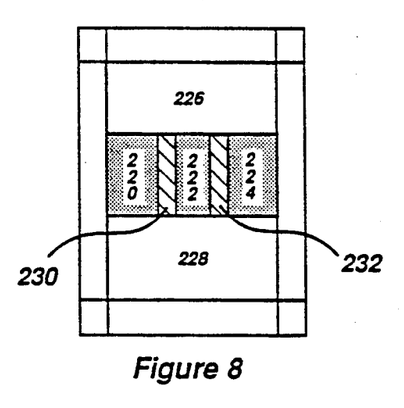
FIG. 8 is a diagram of a page layout having a plurality of side-by-side APOs.

FIG. 8 shows a resultant page layout having a plurality of closely positioned APOs. The page layout of FIG. 7 includes APOs 220, 222, 224 and text areas 226, 228. In this instance, APOs 220, 222, 224 are positioned closer together than a predetermined minimum distance. In the preferred practice of the present invention, the minimum distance is one inch, although any minimum distance may be defined. In instances such as the page layout of FIG. 8, the present invention creates areas 230, 232 which comprise "dead space" which cannot be filled with text.

Each of the examples described above are products of an overall process which is described in more detail in conjunction with the pseudo-code listings of Tables 1 and 2. A list of definitions used in the context of the present invention is included herewith as Appendix I.

Figure 9:
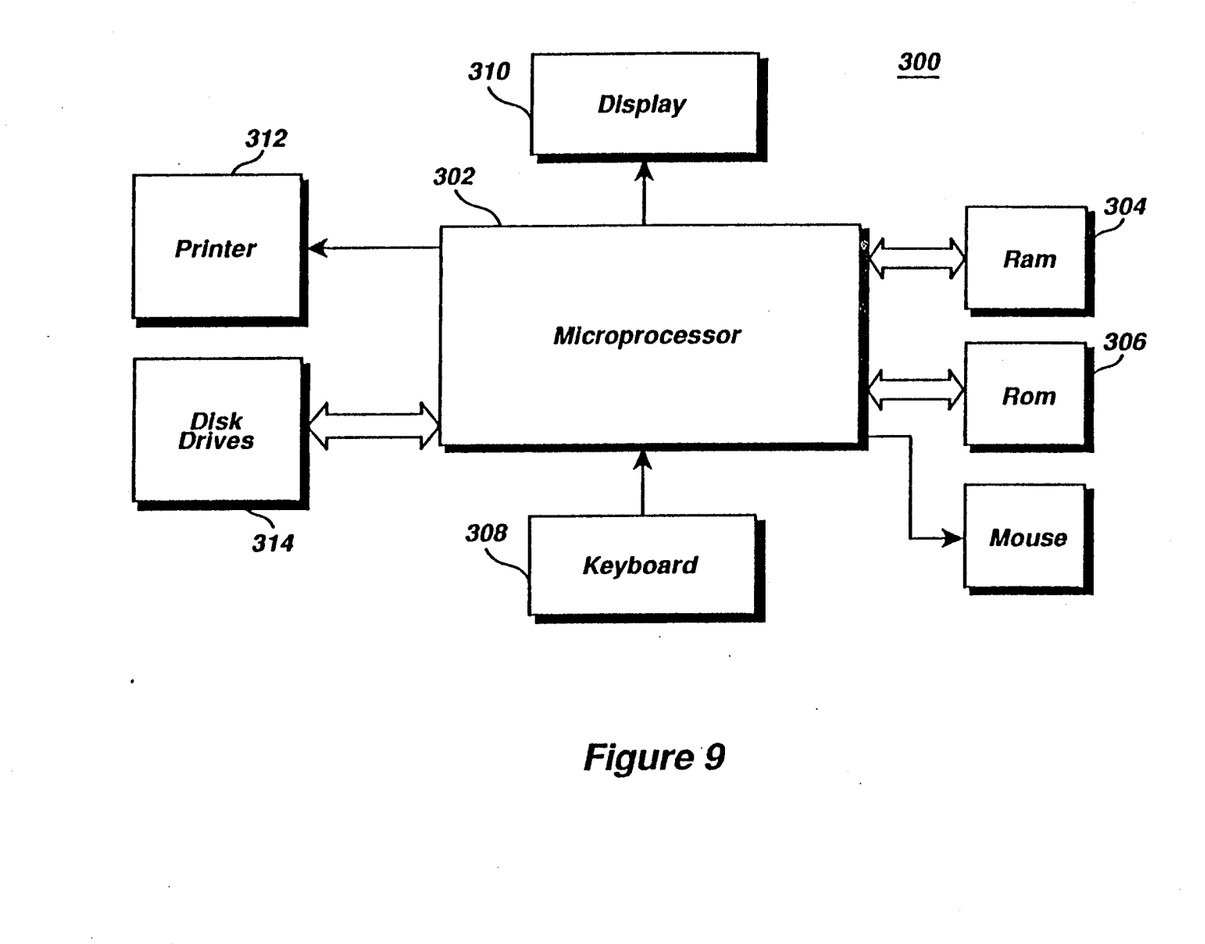
FIG. 9 is a schematic diagram of a computer system adapted for use with the present invention.

Referring now to FIG. 9, the present invention is adapted for use with a general purpose computer system 300 as well as a variety of special purpose computer systems (not shown). The computer system 300 adapted to execute any of the well known, MS-DOS, PC-DOS, OS-2 or Mac-OS operating systems. The computer system 300 comprises a microprocessor 302, a random access memory (RAM) 304, a read-only memory (ROM) 306, a mouse 3087, a keyboard 308, output devices, such as a display 310 and a printer 312, and one or more disk drives 314. The present invention is adapted for implementation as a document processor system used in conjunction with a word processing or page layout application which may be stored on floppy or hard disks and which may be accessed by the computer system 300 under any of the above-mentioned or other operating systems. The present invention is adapted for implementation in a computer language such as "C" which may compiled based on the instruction set of the desired computer system.

The detailed operation of the present invention is described in conjunction with the pseudo-code listings of Tables 1 and 2. Those of ordinary skill in the art can readily convert these pseudo-code listings into "C" programs for implementing the features of the present invention.

Referring now to the pseudo-code listing of Table 1, FAssignLr is invoked when a page layout is requested by a user. When invoked, in step 1.1 FAssignLr sets a prospective chain height to a very large number, preferably the height of the target page, and the soft bottom flag is initialized to MAYBE. Loop 1.2 is invoked for each default layout rectangle to determine whether the default layout rectangle is intersected by an APO. For each iteration of loop 1.2, a new LR is created and tested for intersections with APOs. For each LR created, if an intersection with an APO is detected, ConstrainToAbs is called in step 1.2.1 to eliminate the intersection. Step 1.2.2 is then invoked to determine whether the default layout rectangle has zero height or is shorter than a predefined overlap space. These parameters are typically set by previous invocations of FAssignLr and ConstrainToAbs. If the default layout rectangle has zero height or is shorter than the predefined overlap space, nested loop 1.2.2.1 is invoked to determine whether a reserve was created on a previous invocation of ConstrainToAbs. If so, step 1.2.2.1 sets the default layout rectangle equal to the reserve rectangle. FAssignLr then returns to loop 1.2 in step 1.2.2.1.2.

If the rectangle has zero height or is shorter than the predefined LR overlap and if a chain exists, FAssignLr proceeds to step 1.2.2.3.2 described below. Otherwise, if the rectangle has zero height or is shorter than the overlap and if the bottom of the rectangle is at or below the bottom of the page, FAssignLr enters nested loop 1.2.2.3. In step 1.2.2.3.1, if text must be placed on the page, FAssignLr proceeds to loop 1.3, described below. Otherwise, the LR is set to NIL to indicate that there is no LR in step 1.2.2.3.2 described below. If the LR has positive height and is smaller than the chain height, the chain height is set to the rectangle's height in step 1.2.2.3.3 and FAssignLr jumps to loop 1.4, described below.

If a chain did not exist in step 1.2.2.2, and the "Y" position pointer is not pointing to the bottom of the page, the default layout rectangle's top is set to the bottom of the current rectangle to update the "Y" pointer and FAssignLr returns to the beginning of loop 1.2.

If an LR is created which did not intersect an APO in step 1.2, or, after the intersections are successfully removed, FAssignLr proceeds to step 1.3 to add the default layout rectangle to the current LR and add the LR to an array of LRs. If ConstrainToAbs created a reserve rectangle, FAssignLr proceeds to loop 1.4 where in step 1.4.1 if no chain has been previously created, the current LR becomes the start of the chain. Otherwise the LR is appended to the existing chain. In Step 1.4.2, if the current rectangle's height is shorter than the chain height, the chain height is set to, the rectangles height and in step 1.4.3, the default layout rectangle is set to the reserve rectangle to accept the reserve rectangle. FAssignLr then returns to step 1.2.

In loop 1.5, after all text areas and reserves have been processed for each LR, if a chain exists, if only one LR is present in the chain, the chain is destroyed in step 1.5.1 and the LR is treated as a normal LR. Otherwise, if a reserve was just processed, and the new rectangle is shorter than the chain height, the chain height is set to the rectangles height in step 1.5.2.1. In step 1.5.2.2, the NIL pointer is sent to the end on the chain and in step 1.5.2.3, all LRs in the chain are set to the same height. FAssignLr then returns.

Referring now to Table 2, ConstrainToAbs is invoked by FAssignLr whenever an LR intersects an APO. For each rectangle in the array of LR, ConstrainToAbs first determines whether a LR is not an APO or has zero width or height. If so, ConstrainToAbs proceeds to the next LR. In step 2.3, ConstrainToAbs determines whether the LR intersects an APO by performing the tests of steps 2.3.1 to 2.3.3. In step 2.4, ConstrainToAbs determines whether the APO and LR are side by side by testing whether the APO top minus the LR top are greater than the LR overlap distance. If the APO and LR are not side by side, and the APO top is less than or equal to the LR bottom, the LR bottom is set to the APO top position to create an area next to the APO which can be aligned with another LR and ConstrainToAbs returns to loop 2.1. Otherwise, if the APO and the LR are side by side, and the APO bottom is less than the LR bottom, the LR bottom is set to the APO bottom.

In loop 2.6, ConstrainToAbs determines whether the new default layout rectangle is to be created with a soft bottom. If the soft bottom flag is not already set to NO, and if the text bottom is less than the bottom of the page (or the top of the highest APO on the page which intersects the LR, whichever is smaller), the soft bottom flag is set to YES. Otherwise, it is set to NO.

ConstrainToAbs then determines whether a valid text area can be created and if so where to position it. In step 2.7, if the default layout rectangle left is greater than or equal to the APO left, the APO affects the left edge of the rectangle and the default layout rectangle left edge is set equal to the APO right edge and control returns to loop 2.1. In step 2.8, if the default layout rectangle right edge minus the APO right edge is less than the minimum width and if the APO left edge minus the default layout rectangle left edge is less than the minimum width, the default layout rectangle left edge is set to the APO right edge and control returns to the beginning of loop 2.1. Otherwise, a valid split was created and the reserve LR is set to the portion of the default layout rectangle that lies to right of the APO.

In step 2.9, whether a reserve is created, the right edge is set to the APO left edge. If the resultant default layout rectangle is narrower than a predetermined minimum width, the default layout rectangle top is set to the default layout rectangle to create an area of dead space and update the update the "Y" pointer and and control is returned to FAssignLr. Otherwise, ConstrainToAbs returns to the beginning of loop 2.1.

In summary, a method and means of automatically generating a page layout in a document processor has been described. The present invention provides for the placement of absolutely positioned objects on a page layout and means are provided for automatically allocating text areas surrounding the absolutely positioned objects. Accordingly, other uses and modifications of the present invention will be readily apparent to persons of ordinary skill in the art and all of such uses and modifications are intended to fall within the scope of the appended claims.

TABLE 1

FAssignLr

| | |
|---|---|
| 1.1. | Set the chain height to a page height, set the LR's soft bottom flag to MAYBE |
| 1.2. | If APOs are present in the array of LRS |
| 1.2.1. | Call ConstrainToAbs, which modifies the default layout rectangle to eliminate intersections |
| 1.2.2. | If the modified default layout rectangle has zero height or is shorter than a predefined overlap |
| 1.2.2.1. | If a reserve rectangle was created |
| 1.2.2.1.1. | Set the default layout rectangle to the reserve rectangle |
| 1.2.2.1.2. | Go to 1.2 |
| 1.2.2.2. | If a chain exists, go to 1.2.2.3.2. |
| 1.2.2.3. | If the bottom of the rectangle is at or below the bottom of the page |
| 1.2.2.3.1. | If no text currently exists on the page, go to 1.3. |
| 1.2.2.3.2. | Set the current LR to NIL |
| 1.2.2.3.3. | If the default layout rectangle has positive height and is smaller than the chain height, set the chain height to the default layout rectangle's height |
| 1.2.2.3.4. | Go to 1.4. |
| 1.2.2.4. | Reset the default layout rectangle's top to the current rectangle's bottom |
| 1.2.2.5. | Go to 1.2 |
| 1.3. | Add the default layout rectangle to the current LR; add the text area to the array of text areas |
| 1.4. | If the latest call to ConstrainToAbs created a reserve rectangle |
| 1.4.1. | If no chain exists, make the current LR the start of the chain. Otherwise, append the current LR to the chain. |
| 1.4.2. | If the current rectangle is shorter than the chain height, set the chain height to the rectangle's height |
| 1.4.3. | Set the default layout rectangle to the reserve rectangle |
| 1.4.4. | Go to 1.2 |
| 1.5. | If the chain exists |
| 1.5.1. | If exactly one LR is in the chain, destroy the chain; the LR will be treated as a normal LR |
| 1.5.2. | Otherwise |
| 1.5.2.1. | A reserve was just processed, and the new rectangle is shorter than the chain height, set the chain height to the rectangle's height |
| 1.5.2.2. | Ensure that the chain ends in NIL pointer |
| 1.5.2.3. | Ensure that all LRs in the chain have the same height |
| 1.6 | Return |

TABLE 2

ConstrainToAbs

| | |
|---|---|
| 2.1. | For each rectangle in the LR array, do: |
| 2.2. | If the LR does not represent an APO, or has no height or width, go to 2.1 |
| 2.3. | If the APO does not intersect the default layout rectangle, go to 2.1. The rectangles do not intersect when any of the following is true: |
| 2.3.1. | APO left is >= the text right |
| 2.3.2. | APO right is <= text left |
| 2.3.3. | APO bottom is <= text top |
| 2.4. | If APO top minus text top > LR overlap, then the APO and default layout rectangles are not side by side |
| 2.4.1. | If the APO top <= text bottom, set the default layout rectangle bottom to APO top |
| 2.4.2. | Go to 2.1 |
| 2.5. | Otherwise they are side by side. If the APO bottom is less than the default layout rectangle bottom, set default layout rectangle bottom to APO bottom |
| 2.6. | If the LR's soft bottom is not NO |
| 2.6.1. | If the default layout rectangle's bottom is less than the bottom of the page (or the top of the highest APO on the page which intersects the default layout rectangle, whichever is smaller), set soft bottom to YES, otherwise set it to NO |
| 2.7. | If default layout rectangle left is >= APO left, the APO affects the left edge of the rectangle |
| 2.7.1. | Set default layout rectangle left to APO right |
| 2.7.2. | Go to 2.1 |
| 2.8. | If default layout rectangle right minus APO right is less than a predetermined minimum width |
| 2.8.1. | If APO left minus default layout rectangle left is less than a predetermined minimum width |
| 2.8.1.1. | Set default layout rectangle left to APO right |
| 2.8.1.2. | Go to 2.1 |
| 2.8.2. | Otherwise a valid split has been created; set the reserve to the portion of the default layout rectangle that lies to the right of the APO |
| 2.9. | Set default layout rectangle right to APO left |
| 2.10. | If the default layout rectangle is narrower than a predetermined minimum width |
| 2.10.1. | Set default layout rectangle top to default layout rectangle bottom |
| 2.10.2. | Return |
| 2.11. | Otherwise go to 2.1 |

APPENDIX I

Terms:

| | |
|---|---|
| APO | Absolutely Positioned Object, a group of paragraphs that are placed at a specific location on the page by the user. |
| Chaining | Creating a set of rectangles which skip from one side of an APO to another. The text-filling routine (not described in this document) handles the actual assignment of text into strips within the chained rectangles. |
| LR | Layout Rectangle; describes the area into which text will be formatted; also contains state information which describes the rectangle. |
| LR overlap | The amount of unusable space in the previous rectangle. The space was unusable because the next line of text was taller than the remaining space. |
| Minimum Width | An arbitrary value (one inch) which is the narrowest rectangle which we allow. |

-continued
APPENDIX I

Terms:

| | |
|---|---|
| Reserve Rectangle | A rectangle describing the right half when a text rectangle is split by an APO; this is the basis of chaining. The left half of the split is usually processed immediately, the reserve requires another processing pass. |
| Soft bottom | A three-state flag: MAYBE means the flag has not yet been set; YES means that the last line of text in the LR may exceed the bottom of the rectangle; NO means the LR s bottom may not be exceeded. The YES setting causes text that is flowing around an APO to be contiguous and to not have gaps between lines. |
| Text area | An area in a document which may be filled with text. Text areas are returned by FAssignLr. |
| Default Layout Rectangle | A proposed rectangle for the next portion of the document to be formatted into. The algorithm described here accepts a default layout rectangle and modifies it to avoid other rectangles. |

I claim:

1. A method for generating a plurality of layout rectangles for a page in a computer system for processing documents, the page comprising absolutely positioned object and unpositioned data, the absolutely positioned objects having a predefined size and location on the page, the unpositioned data may include text characters and graphic objects, the layout rectangles to define areas into which the unpositioned data may be placed, the method comprising the steps of:
   (a) defining a default layout rectangle to encompass the page;
   (b) determining if any absolutely positioned objects intersect the default layout rectangle;
   (c) if no absolutely positioned object intersects the default layout rectangle, generating a layout rectangle equal to the default layout rectangle;
   (d) if an absolutely positioned object intersects the default layout rectangle,
      (1) generating a layout rectangle from the default layout rectangle such that the layout rectangle does not include an absolutely positioned object; and
      (2) redefining the default layout rectangle to exclude the generated layout rectangle; and
   (e) repeating steps (b) through (d) until no absolutely positioned object intersects the default layout rectangle and wherein the generated layout rectangles define areas into which the unpositioned data may be placed.

2. The method of claim 1 wherein the step of generating a layout rectangle includes the step of:
   setting a layout rectangle equal to area of the default layout rectangle above an absolutely positioned object.

3. The method of claim 1 wherein the step of generating a layout rectangle includes the step of:
   setting a layout rectangle equal to the area of the default layout rectangle to the left of an absolutely positioned object.

4. The method of claim 3 wherein the step of generating a layout rectangle includes the steps of:
   defining a reserve rectangle equal to the area of the default layout rectangle that is to the right of an absolutely positioned object;
   generating a reserve layout rectangle from the reserve rectangle such that the reserve layout rectangle does not include an absolutely positioned object; and
   linking a layout rectangle and the reserve layout rectangle to form a chain of layout rectangles.

5. The method of claim 3 wherein the step of generating a layout rectangle includes the step of:
   redefining the layout rectangle to accommodate an integral number of lines of unpositioned text.

6. The method of claim 1 wherein the step of generating a layout rectangle includes the step of:
   setting a layout rectangle equal to the area of the default layout rectangle to the right of an absolutely positioned object.

7. The method of claim 1 wherein the step of generating a layout rectangle includes the step of:
   setting a layout rectangle equal to the area of the default layout rectangle in between two absolutely positioned objects.

8. A method for generating a plurality of layout rectangles for a page in a computer system for processing documents, the page comprising absolutely positioned objects, the absolutely positioned objects having a predefined size and location on the page, the layout rectangles to define areas into which unpositioned data may be placed, the method comprising the steps of:
   (a) defining a default layout rectangle to encompass a portion of the page;
   (b) generating the layout rectangle from the default layout rectangle such that the layout rectangle does not include an absolutely positioned object;
   (c) redefining the default layout rectangle to exclude the generated layout rectangle; and
   (d) repeating steps (b) and (c) if the default layout rectangle intersects an absolutely positioned object.

9. A method for specifying a text area on a page in a computer document processing system in which to place unpositioned data, the unpositioned data including text characters and graphic objects, the page having associated absolutely positioned objects, the steps of:
   (a) defining an area of the page;
   (b) determining if an absolutely positioned object intersects the defined area of the page, the absolutely positioned objects having a predefined size and location on the page; and
   (c) if an absolutely positioned object intersects the defined are of the page, specifying a text area that is within the defined area and that does not include an absolutely positioned object.

10. The method of claim 9 wherein the step of specifying a text area includes the step of linking various text areas to form a chain of text areas.

11. A document processing system for generating a page layout for a page, the page comprising absolutely positioned objects and unpositoned data, the unpositioned data including text characters and graphic objects, the system comprising:
   means for defining the size and location of the absolutely positioned objects on the page in accordance with input data from a user of the document processing system;
   means for positioning the absolutely positioned objects on the page in accordance with the defined size and location;
   means for defining a default layout rectangle;

means for defining a layout rectangle within the default layout rectangle; and means for redefining the default layout rectangle to exclude the defined layout rectangles.

12. The document processing system of claim 11 wherein the means for automatically defining a plurality of layout rectangles includes:

means for linking layout rectangles to allow unpositioned data to flow around an absolutely positioned object.

13. The document processing system of claim 11 wherein the means for automatically defining a plurality of layout rectangles includes:

means for redefining a layout rectangle to accommodate a integral number of lines of text characters.

* * * * *

UNITED STATES PATENT AND TRADEMARK OFFICE
CERTIFICATE OF CORRECTION

PATENT NO. : 5,214,755
DATED : May 25, 1993
INVENTOR(S) : Christopher A. Mason

It is certified that error appears in the above-identified patent and that said Letters Patent is hereby corrected as shown below:

In column 13, claim 1, line 27, please delete "object" and substitute therefor --objects--.

In column 14, claim 9, line 50, please delete "are" and substitute therefor --area--.

Signed and Sealed this

Fifteenth Day of March, 1994

Attest:

BRUCE LEHMAN

*Attesting Officer*  *Commissioner of Patents and Trademarks*